P. HICKEY
PAIL.

No. 193,247.  Patented July 17, 1877.

Witnesses:
Lewis F. Brown
A. P. Grant

Inventor:
Patrick Hickey
by John A. Wiedersheim
Attorney.

UNITED STATES PATENT OFFICE.

PATRICK HICKEY, OF PHILADELPHIA, PENNSYLVANIA.

IMPROVEMENT IN PAILS.

Specification forming part of Letters Patent No. 193,247, dated July 17, 1877; application filed December 1, 1876.

*To all whom it may concern:*

Be it known that I, PATRICK HICKEY, of the city and county of Philadelphia, and State of Pennsylvania, have invented a new and useful Improvement in Pails; and I do hereby declare the following to be a clear and exact description of the nature thereof, sufficient to enable others skilled in the art to which my invention appertains to fully understand, make, and use the same, reference being had to the accompanying drawings, making part of this specification, in which—

Figure 1:
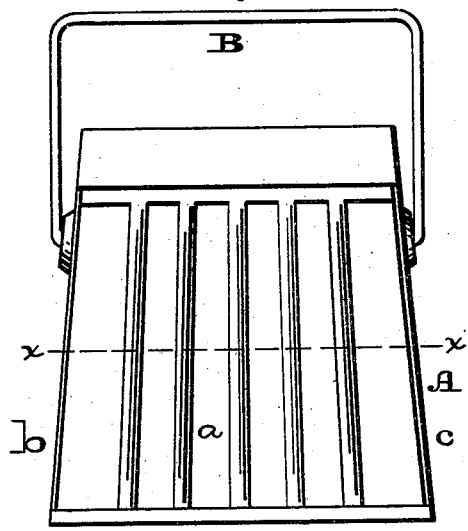
Figure 2:
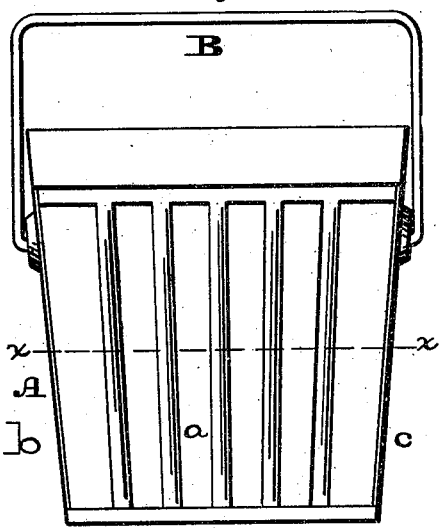
Figure 3:
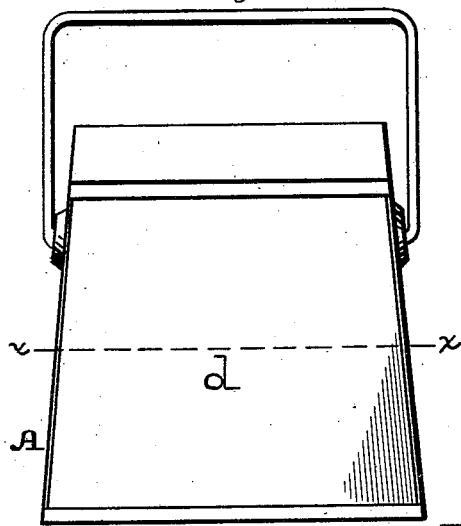
Figure 4:
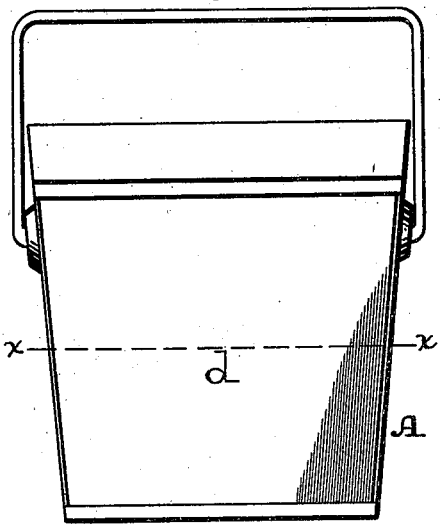
Figure 5:
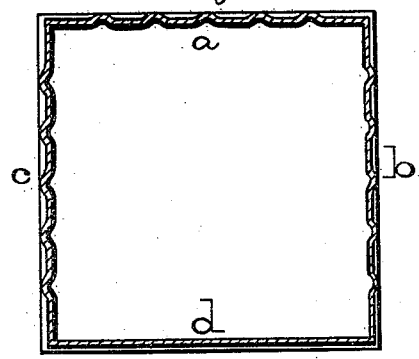

Figures 1 and 2 are side elevations of the pail embodying my invention. Figs. 3 and 4 are views of opposite sides thereof. Fig. 5 is a horizontal section in line $x\ x$.

Similar letters of reference indicate corresponding parts in the several figures.

My invention relates to a pail adapted for mince-meat, lard, and other articles; and it consists of a metallic body with certain of its sides corrugated, and one side left plain, and a horizontal bead, whereby the pail may be conveniently filled, carried, and emptied, and a number of pails packed with economy of space. The pail is strong. Provision is made for attachment of a label, and there is a tight joint between the lid and body.

Referring to the drawings, A represents the body of the pail, and B the bail thereof. The body A is of the form of the frustum of a pyramid, the widest part being at top or bottom, as desired. The sides $a\ b\ c$ of the body are corrugated, and the side $d$ is left with a plain or unraised surface.

It will be seen that the shape of the body is such that a number of pails may be readily packed economic of space by arranging them side by side, the tops and bottoms alternating, and the pails may be conveniently filled, carried, and emptied.

It will also be seen that the corrugations greatly stiffen the body of the pail, whereby the latter will retain its shape in usage, and render long service.

It will further be seen that the plain side or surface $d$ admits of the ready pasting or gumming of the indicating-label thereto without liability of subsequent abrasion or loosening thereof during transportation or handling.

It will also be seen that the corrugations of the sides $a\ b\ c$ are raised, preferably, outwardly, whereby the crowns of said corrugations are outside, so that the greatest strength will be imparted to the pail.

At or about the upper termination of the corrugations, and near the upper edge of the plain side $d$ there is a horizontally-extending raised bead, which serves to stiffen the upper part of the body A, form the stop for the lid thereof, and provide a close joint between the lid and body.

Having thus described my invention, what I claim as new, and desire to secure by Letters Patent, is—

The body A, with sides $a\ b\ c$, formed with corrugations, a horizontal bead, and a plain side, $d$, substantially as and for the purpose set forth.

PATRICK HICKEY.

Witnesses:
 JOHN A. WIEDERSHEIM,
 H. E. HINDMARSH.